(12) United States Patent
Perrin et al.

(10) Patent No.: US 10,138,137 B1
(45) Date of Patent: Nov. 27, 2018

(54) WASHOUT PAN FOR THIXOTROPIC MATERIALS

(71) Applicants: Duane Perrin, Canyon Lake, CA (US); Patrick Gee, Chino Hills, CA (US)

(72) Inventors: Duane Perrin, Canyon Lake, CA (US); Patrick Gee, Chino Hills, CA (US)

( * ) Notice: Subject to any disclaimer, the term of this patent is extended or adjusted under 35 U.S.C. 154(b) by 0 days.

(21) Appl. No.: 15/070,959

(22) Filed: Mar. 15, 2016

(51) Int. Cl.
*B01F 15/00* (2006.01)
*C02F 1/00* (2006.01)
*B01D 21/00* (2006.01)
*C02F 103/12* (2006.01)

(52) U.S. Cl.
CPC .......... *C02F 1/004* (2013.01); *B01D 21/0012* (2013.01); *B01F 15/00* (2013.01); *C02F 2103/12* (2013.01)

(58) Field of Classification Search
CPC .. C02F 1/004; C02F 2103/12; B01D 21/0012; B28C 5/4203; B28C 5/4244; B28C 5/4248; B28C 5/4251; B28C 5/168; B01F 15/00; B01F 15/00019
USPC ........ 366/68, 187, 348–349, 53–63; 298/1 B
See application file for complete search history.

(56) References Cited

U.S. PATENT DOCUMENTS

| | | | | |
|---|---|---|---|---|
| 3,997,434 A | * | 12/1976 | Macauley, Jr. ......... | B03B 9/063 209/10 |
| 4,192,745 A | * | 3/1980 | Hood ....................... | B01F 9/06 106/713 |
| 4,285,808 A | * | 8/1981 | Horton ..................... | B03B 5/54 209/17 |
| 5,127,740 A | * | 7/1992 | DeBoer ................... | B28C 7/0053 220/504 |
| 5,178,455 A | * | 1/1993 | Ohsaki ..................... | B03B 9/00 106/639 |
| 5,685,978 A | * | 11/1997 | Petrick .................... | B01D 29/03 209/249 |
| 5,699,969 A | * | 12/1997 | Isaji ......................... | B03B 5/02 241/24.12 |
| 5,741,065 A | * | 4/1998 | Bell ......................... | B28C 5/18 366/349 |
| 5,778,910 A | * | 7/1998 | Brenner .................. | B03B 9/063 134/104.3 |
| 5,833,863 A | * | 11/1998 | Richards ................ | B01D 21/01 210/712 |

(Continued)

FOREIGN PATENT DOCUMENTS

GB 2467005 A * 7/2010 ............... C02F 1/66

OTHER PUBLICATIONS

HD Supply, Sell Sheet—"Brigade Washout Pans"; downloaded from whitecap.com with a file date of Oct. 23, 2015; 12 pages.

*Primary Examiner* — Charles Cooley
(74) *Attorney, Agent, or Firm* — Alford Law Group, Inc.; William E. Alford; David T. Bracken

(57) ABSTRACT

The present invention is an improved washout pan and method for using it that automatically induces stress at the materials-pan surface interface to induce release of cement-containing materials by the nature of the construction of the washout pan and its response to being moved from a horizontal to a vertical position. The composition of the invention washout pan is critical to the objects of the invention, in that it is preferably formed of polypropylene in a rotomolding process as a single piece with a general overall shape of a box with a slurry body capacity of from 100 to 300 gallons.

11 Claims, 6 Drawing Sheets

(56) References Cited

U.S. PATENT DOCUMENTS

| | | | | |
|---|---|---|---|---|
| 6,039,468 A * | 3/2000 | Kowalcyzk | B28C 5/4241 | 366/41 |
| 6,155,277 A * | 12/2000 | Barry | B01F 13/0035 | 134/104.4 |
| 6,461,098 B1 * | 10/2002 | Elefsrud | B01F 15/00025 | 366/41 |
| 6,782,925 B2 * | 8/2004 | Raposo | B03B 9/063 | 141/11 |
| 6,802,964 B2 * | 10/2004 | Preisser | B01D 21/02 | 209/451 |
| 6,866,047 B1 * | 3/2005 | Marvin | B01F 13/0035 | 134/111 |
| 6,966,687 B1 * | 11/2005 | Elefsrud | B28C 5/4203 | 366/110 |
| 7,117,995 B2 * | 10/2006 | Connard, III | B28C 5/4203 | 209/353 |
| 7,118,633 B2 * | 10/2006 | Jenkins | B08B 17/00 | 134/10 |
| 7,147,360 B2 * | 12/2006 | Elefsrud | B28C 5/4203 | 366/14 |
| 7,232,189 B2 * | 6/2007 | Covington | B60P 1/6463 | 220/1.5 |
| 7,506,672 B2 * | 3/2009 | Manno | B03B 9/063 | 134/104.4 |
| 7,594,524 B2 * | 9/2009 | DeCollibus | B03B 9/063 | 134/104.4 |
| 7,635,010 B1 * | 12/2009 | Manno | B08B 3/006 | 134/104.4 |
| 7,699,065 B2 * | 4/2010 | Fitzgerald | B03B 9/063 | 134/117 |
| 7,913,704 B1 * | 3/2011 | Abney, Sr. | B01D 21/0012 | 134/109 |
| 8,020,569 B2 * | 9/2011 | Leonardich | B08B 3/02 | 134/104.2 |
| 8,079,377 B2 * | 12/2011 | Jenkins | B08B 17/00 | 134/123 |
| 8,079,746 B2 * | 12/2011 | Lundberg | B08B 9/00 | 193/10 |
| 8,083,394 B2 * | 12/2011 | Fischer | B08B 9/08 | 366/41 |
| 8,113,220 B2 * | 2/2012 | Inglese | B28B 7/06 | 134/104.1 |
| 8,734,587 B2 * | 5/2014 | Pruyn | B28C 5/4203 | 134/10 |
| 8,821,725 B2 * | 9/2014 | Weston | B03B 9/063 | 137/574 |
| 8,931,495 B1 * | 1/2015 | Abney, Sr. | B03B 9/063 | 134/104.2 |
| 9,937,636 B2 * | 4/2018 | Connard, III | B28C 5/4203 | |
| 9,943,982 B2 * | 4/2018 | Connard, III | B28C 5/4203 | |
| 9,950,444 B2 * | 4/2018 | McFarlane | B03B 9/063 | |
| 2001/0000640 A1 * | 5/2001 | Welton | B60P 1/283 | 298/1 B |
| 2002/0092798 A1 * | 7/2002 | Dehart | B01D 21/02 | 209/17 |
| 2002/0108537 A1 * | 8/2002 | Beckham | B03B 9/063 | 106/745 |
| 2003/0070980 A1 * | 4/2003 | Ray | B01D 29/27 | 210/489 |
| 2003/0079796 A1 * | 5/2003 | Raposo | B03B 9/063 | 141/5 |
| 2004/0040916 A1 * | 3/2004 | Ruppert | B03B 9/063 | 210/805 |
| 2004/0105741 A1 * | 6/2004 | Inglese | B28B 7/06 | 414/404 |
| 2004/0124190 A1 * | 7/2004 | Beyer | B28B 7/00 | 220/1.5 |
| 2004/0159595 A1 * | 8/2004 | Connard, III | B28C 5/4203 | 209/680 |
| 2005/0219940 A1 * | 10/2005 | Elefsrud | B28C 5/4203 | 366/14 |
| 2006/0000490 A1 * | 1/2006 | Barragan | B08B 3/02 | 134/10 |
| 2007/0002677 A1 * | 1/2007 | DeCollibus | B03B 9/063 | 366/68 |
| 2007/0170119 A1 * | 7/2007 | Mickelson | C02F 1/66 | 210/724 |
| 2007/0256707 A1 * | 11/2007 | Leonardich | B01D 29/15 | 134/10 |
| 2007/0272271 A1 * | 11/2007 | Petrowich | B03B 9/063 | 134/10 |
| 2008/0175092 A1 * | 7/2008 | Manno | B03B 9/063 | 366/68 |
| 2008/0251471 A1 * | 10/2008 | Inglese | B28B 7/06 | 210/800 |
| 2009/0044832 A1 * | 2/2009 | Leonardich | B08B 3/02 | 134/10 |
| 2009/0178974 A1 * | 7/2009 | Leonardich | B01D 29/15 | 210/651 |
| 2009/0321294 A1 * | 12/2009 | DeLuca, Jr. | B08B 17/00 | 206/524.3 |
| 2010/0051062 A1 * | 3/2010 | Fischer | B08B 9/08 | 134/23 |
| 2010/0232253 A1 * | 9/2010 | Lundberg | B08B 9/00 | 366/68 |
| 2011/0197980 A1 * | 8/2011 | Sullivan | B03B 9/063 | 137/544 |
| 2011/0303243 A1 * | 12/2011 | Leonardich | B08B 3/02 | 134/10 |
| 2012/0111364 A1 * | 5/2012 | Pruyn | B28C 5/4203 | 134/10 |
| 2012/0187034 A1 * | 7/2012 | Shaw | B01D 29/58 | 210/201 |
| 2013/0043196 A1 * | 2/2013 | Ford | B01D 21/0003 | 210/767 |
| 2014/0098625 A1 * | 4/2014 | McFarlane | B08B 17/025 | 366/68 |
| 2014/0332546 A1 * | 11/2014 | Connard | B08B 17/025 | 220/789 |
| 2016/0114497 A1 * | 4/2016 | McFarlane | B03B 9/063 | 210/435 |
| 2016/0221218 A1 * | 8/2016 | Connard, III | B28C 5/0806 | |
| 2016/0221221 A1 * | 8/2016 | Connard, III | B28C 5/4203 | |

* cited by examiner

WASHOUT PAN FOR THIXOTROPIC MATERIALS

FIELD OF THE INVENTION

The present invention is broadly directed to heavy duty, watertight containers, i.e., washout pans, for receiving cement-containing slurries resulting from water washing of drums, chutes, tools and similar items used in mixing, delivering, forming, finishing or otherwise handling slurried cement.

BACKGROUND OF THE INVENTION

It is well known that dry cement must be prepared in equipment specially designed for efficient and complete mixing, mostly with other materials such as sand and gravel. The inevitable result of mixing cement in one location and thereafter removing the mixed cement to pour it at a remote location is that all surfaces of the mixing equipment, transport equipment (such as cement trucks), concrete pumps, and similar equipment that come into contact with the mixed cement must be washed free of the substantial amounts that adhere to those surfaces.

It has been known for hundreds of years that cement-containing slurries behave thixotropically. Thixotropy is a time-dependent shear thinning property. Certain gels or fluids that are thick (viscous) or essentially solids under static conditions will flow (become thin, less viscous) over time when shaken, agitated, or otherwise stressed (time dependent viscosity). They then take a fixed time to return to a more viscous state. Some thixotropic fluids return to a gel or solid state almost instantly, such as cement containing slurries, and are called pseudoplastic fluids. Flow can induce reversible and irreversible structural changes in dispersions. The analysis of flow effects on microstructure and rheology remains one of the challenging problems in colloid science. The rheological manifestation of flow-induced structural changes is variable viscosity. If the changes are reversible and time dependent, the effect is called thixotropy. The microstructural changes due to flow are quite complex and not fully understood.

Compounding the challenges in this complex field is the problem presented by thixotropic, water-containing slurries and semi-solids from washout of cement processing and handling equipment. These washout slurries necessarily contain widely variable proportions of cement, water, gravel (aggregate), polymer enhancers, dirt, construction site waste, and other materials. Once the washout materials make it into a large dump truck or other very large watertight container for transport away from a construction site, the problems presented by their thixotropic states is essentially eliminated, in that the extremely large containers aggregate such a huge mass of the materials that inclining the large container results in fairly easy sliding of the static mass out of the large container.

The problem of forming and then needed to remove essentially a solid state thixotropic material in a small volume, watertight container, i.e., a construction site washout pan has existed for decades. The prior art has stagnated in the field of concrete washout pans. A highly visited website illustrating the fixation of those skilled in the art to a few designs is found at the website www.washoutpan.com, operated by Washoutpan.com, which also shows those designs in its catalog "Brigade Pro Washout Pans". The prior art is dominated with rectangular shaped open pans, often with slanted side walls or with variable depth bottom surfaces. These are all formed of heavy gauge welded steel and fabricated to meet environmental protection regulations requiring that the pans be watertight so that washout materials do not fall onto open ground.

The relatively shallow depth and small capacity of washout pans is a result of the high density of wet concrete at about 2400 kg/m3 and structural limitations of the pans and lifting equipment such as cranes and forklifts. Washout pans can be easily placed in a convenient location for washout of cement handling equipment. However, the washout pans, once filled, must be lifted horizontally by crane or forklift without spilling any of the contents to the large transport dump truck or trailer sized container. Once the washout pan has been positioned over the large container, it is lifted into a vertical position so that the settled, nearly solid, thixotropic materials can be encouraged to fall out. This gravity-only encouragement is generally insufficient to cause the settlement, sticky, thixotropic materials from falling out of the washout pan into the large container. The workers responsible for emptying the washout pans regularly must pound on the walls and floor of the washout pan to induce sufficient agitation at the interface between the thixotropic, cement-containing slurry and the metal surface of the washout pan to reduce the highly viscous bond that has formed quickly between them in the short time the materials have been in the washout pan. Transportation of the washout pan, while inducing vibration into the thixotropic materials, actually makes the problem of getting the material out later even worse—the more viscous and sticky materials settle to the bottom of the washout pan in transportation, forming an intimate bond between the cement-containing materials and the floors and walls of the washout pan.

Washout pans generally have an effective capacity of from 150 to 250 gallons and the washout pan must be capable of holding a watertight load during transport to a larger container. The total weight of these cement-containing materials is regularly over 5,000 pounds. The repeated filling, lifting of an extremely heavy, shifting weight in the pan, and dumping of the washout material into a larger container for transport to a processing facility results in metal fatigue and bending. Even a small leak in the washout pan can bring stiff fines for environmental contamination of a building site. When responsible workers regularly have to pound heavily on the pan walls and floors with hammers to dislodge the materials when the pan is in a vertical position, the life of the washout pan becomes extremely short.

There is a need for a washout pan that virtually eliminates the need for worker-induced vibration to release cement-containing, thixotropic materials when the pan is moved into a vertical position, where stress at the materials-pan surface interface is automatically induced to release the cement-containing materials by the nature of the construction of the washout pan and its response to being moved from a horizontal to a vertical position.

SUMMARY OF THE INVENTION

The present invention is an improved washout pan and method for using it that automatically induces stress at the materials-pan surface interface to induce release of cement-containing materials by the nature of the construction of the washout pan and its response to being moved from a horizontal to a vertical position. The composition of the invention washout pan is critical to the objects of the invention, in that it is preferably formed of polypropylene in a rotomolding process as a single piece with a general overall wall thickness of from 0.15 to 0.75 inches, and more preferably from 0.25 to 0.40 inches. This produces a washout pan that, in combination with a structurally reinforcing design, weighs from 40 to 70 pounds, and more preferably from 50 to 65 pounds, and is structurally capable of containing and transporting by crane or forklift to a large container, from 4,000 to 8,000 pounds of cement-containing slurry. This performance is comparable to washout pans formed from welded stainless steel.

The invention washout pan comprises a generally rectangular shape with a peripheral reinforcing rim, from which extends down peripheral side walls. The peripheral side walls are intersected about halfway down by a first support floor, wherein are defined at least three openings along a midline of a length of the rectangular shape of the invention washout pan. Extending downward from edges of those three openings are second level support walls that then seal to second level support floors parallel to and equidistant from the first support floor, thereby defining an concave mass cavity for each of the three openings. Two sets of lifting flanges are located equidistant from the midline and extend outward from an outside surface of a lifting section of the peripheral walls. The lifting flanges will be used to lift the invention washout pan when filled with a cement-containing slurry from a horizontal to a vertical position by way of connection to forks of a forklift or to a crane.

A first midline mass cavity is defined adjacent to the lifting section of the peripheral wall and comprises a generally rectangular shape with a first length adjacent to the lifting section of the peripheral wall and has a width normal to that lifting section that is about one fourth to two thirds of the length, more preferably about having a width about one half of the length. The length of the first midline mass cavity is from 30% to 50% of a length of the lifting section of the peripheral wall, most preferably about 35% of the length of the lifting section of the peripheral wall.

A second midline mass cavity is defined at a center of the first support floor and has edges generally parallel to the peripheral walls, but has a length about equal to and in line with that of the first midline mass cavity and with a midline width preferably equal to its length or a width within 10% more or less of the length of the first mass cavity. A separation of opposing edges of the first and second mass cavities is preferably equal to a width of the first mass cavity.

A third midline mass cavity is defined adjacent to a bottom section of the peripheral wall parallel to and opposite to the lifting section and comprises a generally rectangular shape with a length about equal to that of the first mass cavity and adjacent to the bottom section of the peripheral wall and also has a width normal to that bottom section that is about the same width as that of the first mass cavity. A separation of opposing edges of the third and second mass cavities is preferably equal to a width of the first mass cavity.

Left and right sections of the peripheral wall join the ends of the lifting section and the bottom section, and define support corners thereof, whereat corner openings are defined in the first support floor and additional second level support walls then extend down from the first support floor to seal to additional second level support floors parallel to and equidistant from the first support floor, thereby defining an additional concave mass cavity for each of the four corners.

Further, a rectangular left opening and rectangular right opening are formed in the first support floor adjacent respectively to the left and right sections of the peripheral wall and extend generally symmetrically from a second midline of the right and left sections to define a length about equal to the width of the second midline cavity and having a width extending from the right or left section respectively so that an opposing edge with the second mass cavity is about equal to the distance separating the first mass cavity and the second mass cavity The arrangement of the structures defining the nine mass cavities provide for elevation of the first support floor from a ground level when the invention washout pan is placed on a level surface, whereby are defined on an underside two sets of two parallel channels, each set of parallel channels being normal to the other to accommodate insertion of forks of a forklift in two parallel channels from the direction of outside surfaces of any of the peripheral walls or for securing a pair of parallel crane straps to be connected with a crane for lifting of the invention washout pan for deposit of its materials into a large container.

The present invention washout pan operates with the following advantage in automatically inducing stress at a materials-pan surface interface to induce release of cement-containing materials by the nature of the construction of the washout pan and its response to being moved from a horizontal to a vertical position. As the lifting section is lifted from a horizontal to vertical position with a thixotropic, cement-containing mass filling the washout pant by way of connection of the lifting flanges to a lifting device (such as a fork lift or crane), the combination of general wall thickness of the polymer washout pan and its arrangement of midline mass cavities causes successively greater upward, curved deformation of second floor support walls nearest the lifting section in each of the midline mass cavities, resulting in relatively instantaneous stress at the interface of the cement-containing mass and said second floor support walls. That stress deformation results in greatest local separation of the cement-containing mass in the first mass cavity from the lifting section portion of its second floor support wall, but which mass shift results in enhancing a similar but lesser mass shift in the second mass cavity at the highest elevation second floor support wall, which mass shift in the second mass cavity thereby enhances the similar but lesser mass shift in the third mass cavity.

The aggregation of these mass shifts act like collapse of dominoes, with a mass in the first mass cavity moving as a single mass outward from the first mass cavity, which, because of a connection of relatively undisturbed and more rigid connecting material between the first and second mass cavities, pulls the mass from the second mass cavity, and so on to the mass of the third mass cavity. These inter-mass cavity connections cause the masses of the other mass cavities to be pulled free as well, without a requirement to used water or hammer pounding to dislodge the materials.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

DETAILED DESCRIPTION OF THE INVENTION

Figure 1:
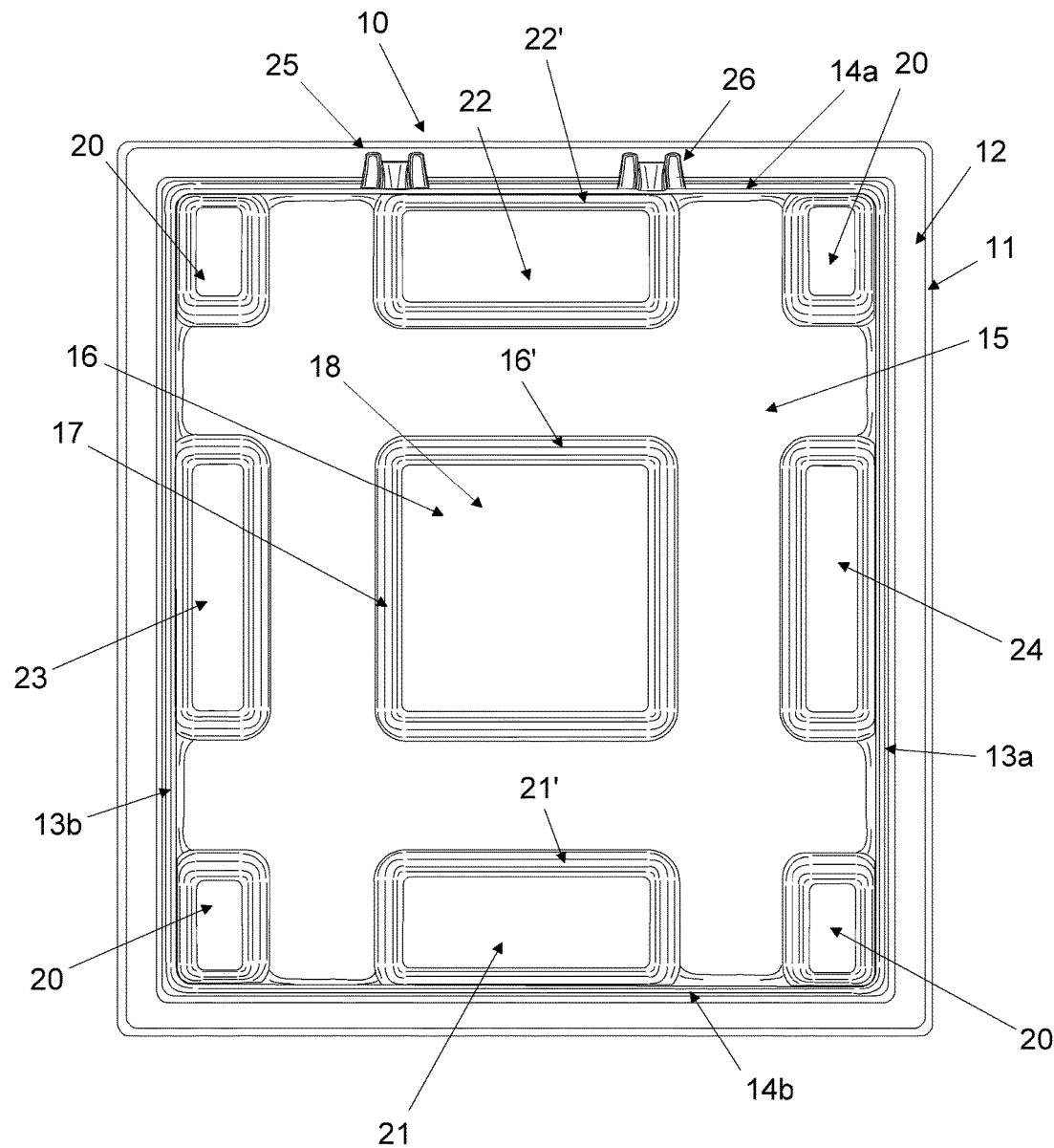
FIG. 1 is a bottom view of the invention washout pan.

FIG. 1 is a bottom view of the invention washout pan 10, generally comprising a reinforced and rotomolded polymer box in a rectangle shape defined by an outer vertical rim 11 directed downward for about 1-2 inches and that extends inward from an upper edge to a horizontal reinforcing edge plate 12, where the combination of the rim 11 and plate 12 provide anti-torsion rigidity so that the polymer box essentially is prevented from twisting or having its peripheral walls 13a,b and 14a,b collapse when filled with cement-containing slurry. Peripheral walls 13a,b and 14a,b extend down from an inner edge of plate 12, being intersected about halfway to set of second level support floors by a first support floor 15. The second level support floors is formed from bottom most portions of nine mass cavity containers (shown concave in this view), comprising first mass cavity container 22, second mass cavity container 16, third mass cavity container 21, right mass cavity container 23, left mass cavity container 24, and corner mass cavity containers 20. Containers 21, 22, 23, 24 and 20 all share portions of their second level support walls with peripheral walls, where container 16 does not. Containers 16, 20, 21, 22, 23 and 24 all define mass cavities in top views, formed by second level support walls that extend down from openings in the first level support floor 15, and that, by example for container 16, are sealed at the bottom by a second level support floor 18. By further example of container 16, a second level support wall 17 is identified. The peripheral walls comprise a lifting section 14a, a bottom section 14b, a right section 13a and a left section 13b, forming corners where are located containers 20. Containers 22, 16 and 21 are midline containers that define midline mass cavities and respectively comprise deforming walls 22', 16' and 21'. Lifting flanges 25 and 26 are formed to extend from lifting section 14a and adapted to receiving bolts, chains or other connecting means for connecting the lifting section to lifting devices to raise the invention washout pan 10 from a horizontal to a vertical position.

Figure 2:
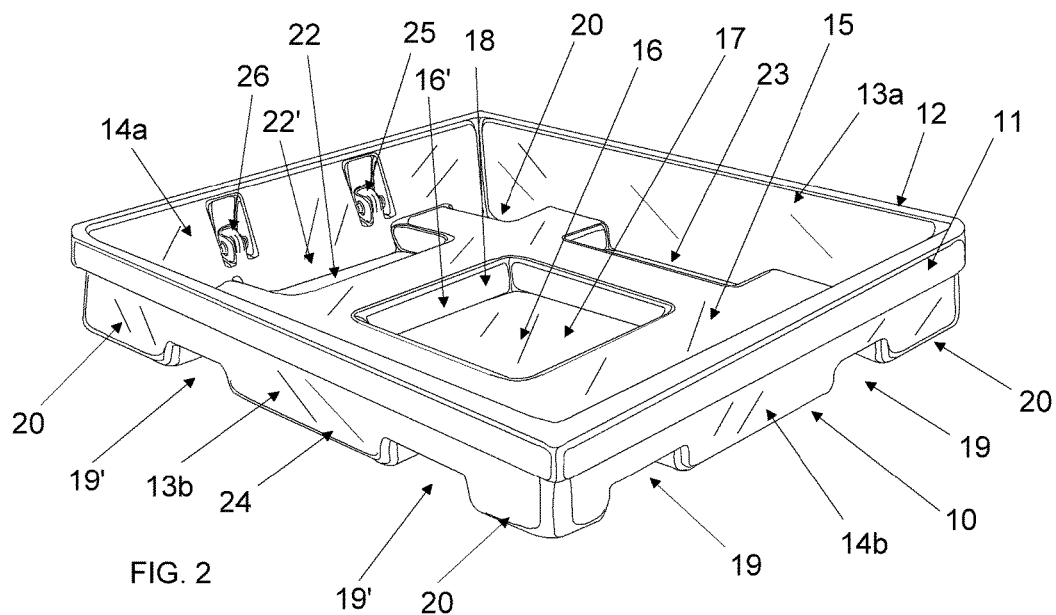
FIG. 2 is a top perspective view of the invention washout pan.

FIG. 2 is a top perspective view of the invention washout pan as in FIG. 1, showing two sets of two parallel horizontal lift support channels 19 and 19', adapted to allow a forklift or straps-equipped crane to horizontally lift pan 10.

Figure 3:
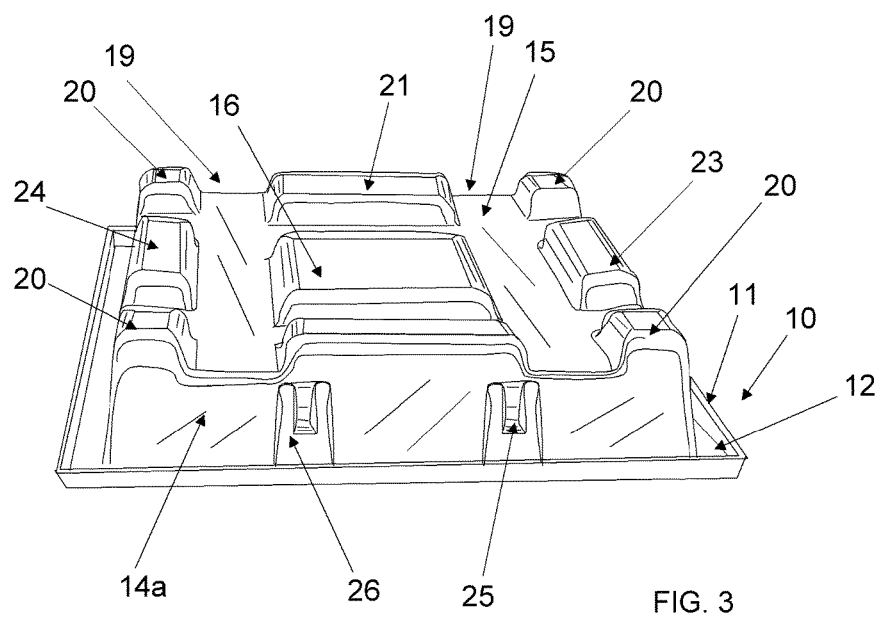
FIG. 3 is a bottom perspective view of the invention washout pan, with a lifting section nearest.

FIG. 3 is a bottom perspective view of the invention washout pan 10, with a lifting section 14a nearest.

Figure 4:
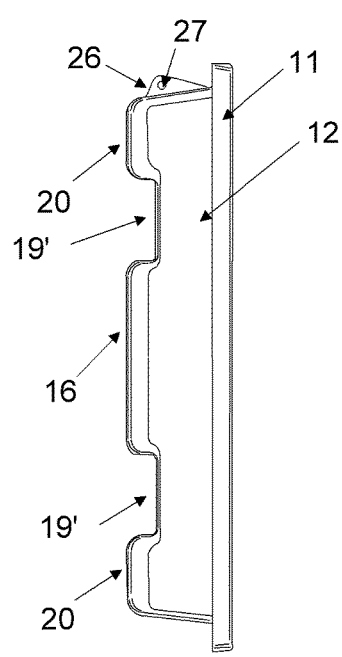
FIGS. 4, 5 and 6 are respectively left side, lifting section, and top views of the invention washout pan of FIG. 1.
Figure 5:
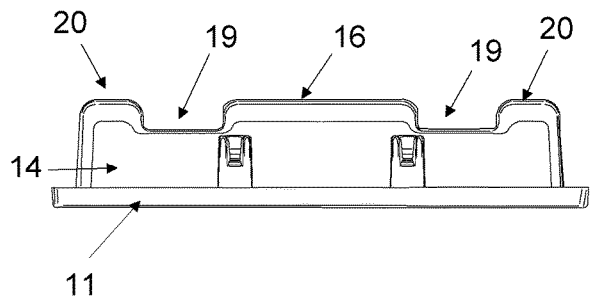
Figure 6:
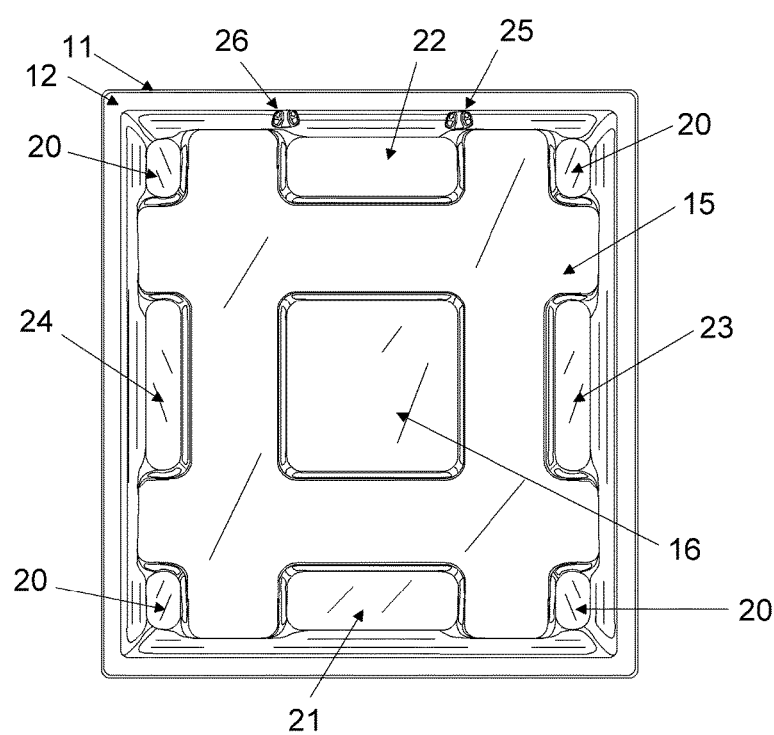

FIGS. 4, 5 and 6 are respectively left side, lifting section, and top views of the invention washout pan of FIG. 1.

Figure 7:
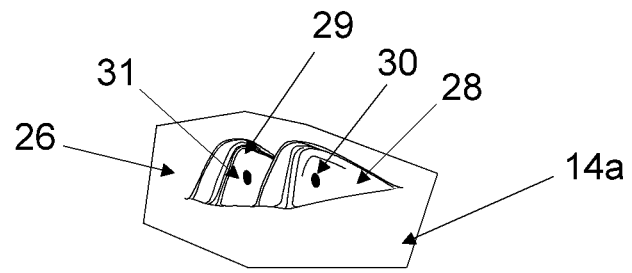
FIG. 7 is a closeup view of a lifting flange in a broken away section of the lifting section of the peripheral wall of the pan of FIG. 1.

FIG. 7 is a closeup view of a lifting flange 26 in a broken away section of the lifting section 14a to the peripheral wall of the pan of FIG. 1, showing a preferred embodiment with two extensions 28 and 29 defining through holes 30 and 31 respectively for insertion of bolts, chains or the like for lifting pan 10.

Figure 8:
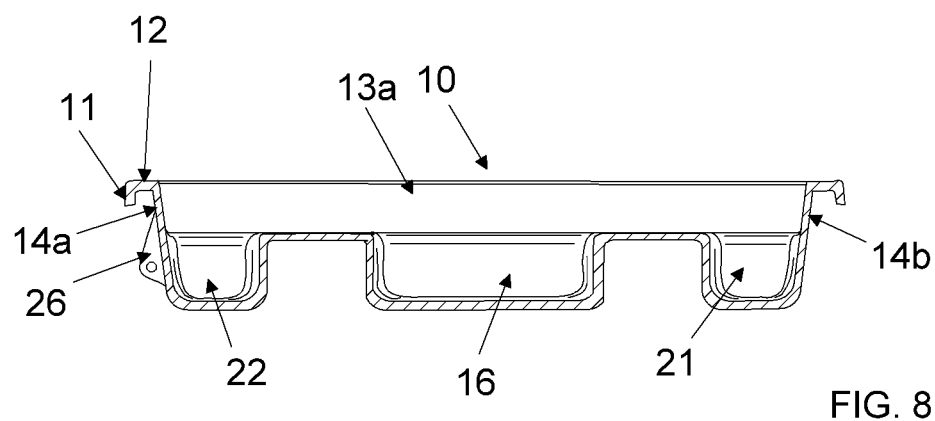
FIG. 8 is midline cross section of the pan of FIG. 1.

FIG. 8 is a midline cross section of the pan of FIG. 1.

Figure 9:
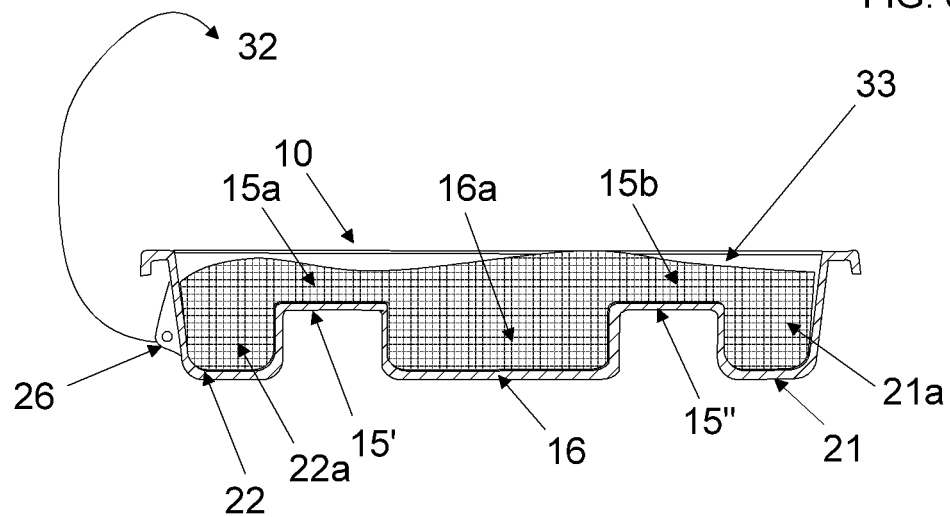
FIG. 9 is the pan of FIG. 8 filled with cement-containing slurry.

FIG. 9 is the pan 10 of FIG. 8 filled with a well-settled cement-containing slurry comprising a substantially rigid but flexible, connected set of masses 22a, 15a, 16a, 15b and 21a ("slurry body"). The nature of sand, gravel, dirt, water, and other components of a washout slurry in a washout pan result in almost instantaneous settling and structurally connected masses as shown. Because they intimately become fixed to the surfaces of containers 22, 16, and 21 and to first support floor 15, removal of the slurry body from a washout pan, contrary to the present invention method, is not often accomplished by way simply raising the washout pan to a vertical position along path 32.

Figure 10:
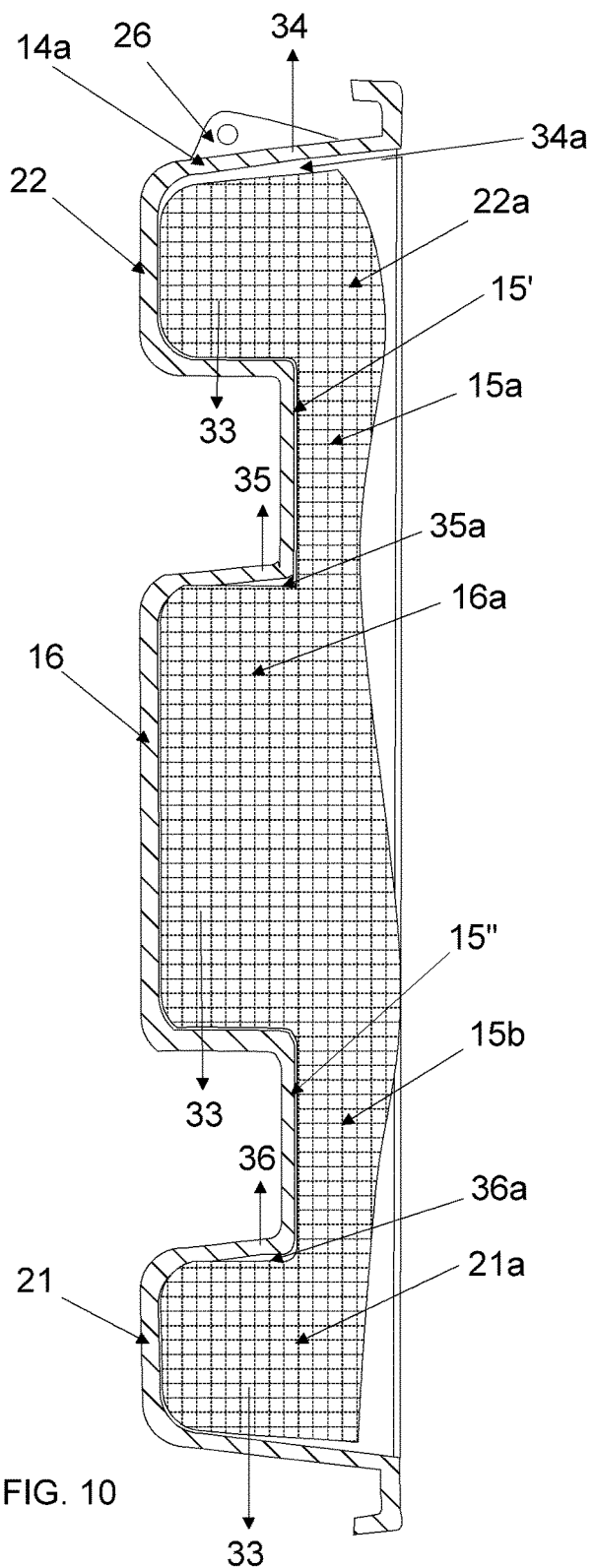
FIG. 10 is a front view photograph of the improved sectionalized soccer goal in accordance with the embodiment from FIG. 5 showing selected sections illuminated.

FIG. 10 is the pan 10 of the view of FIG. 9 in a horizontal, lifted position, showing deformation of second level support walls, i.e., section 14a, wall section 35 deflected in the direction shown, and wall section 36 deflected in the direction shown. These deformations are the result of the gravitational pull downward of the structurally connected slurry body. These deformations cause stress on the slurry body contacting section 14a, wall section 35 deflected in the direction shown, and wall section 36 deflected in the direction shown, dramatically reducing its viscosity and permitting respectively detachments 34a, 35a and 36a, successively smaller due to the greater distance from the lifting flange 26 pulling the polymer body of the pan 10 upward. However, the detachments 34a and 35a result in shifting respectively downward of masses 22a and 16a, thereby respectively forcing the slurry body at interfaces 15' and 15" to slide, reducing the viscosity and connection to the first level support floor 15.

Figure 11:
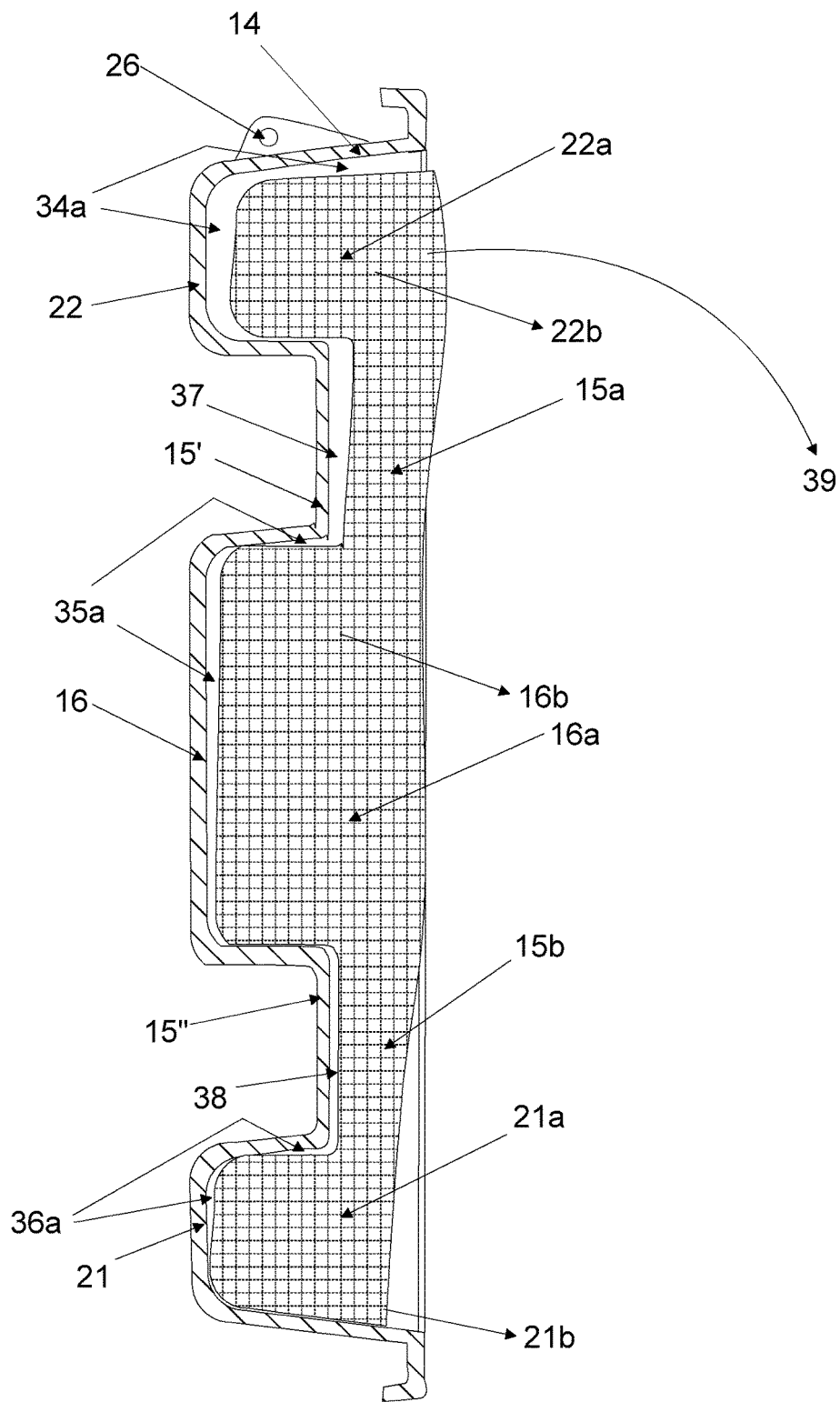
FIG. 11 is the view of FIG. 10 in a horizontal, lifted position, showing deformation of second level support walls of midline cavities deformed upward, resulting in automatic, stress-induced release of the cement-containing slurry from the deformed walls and a relatively rigid mass of in a horizontal, lifted position, showing deformation of second level support walls of midline cavities deformed upward, resulting in automatic, stress-induced release of relatively rigid cement-containing slurry occurs as a substantially single, unbroken body.

The cumulative effects of these changes in FIG. 10 result the release of the slurry body in FIG. 11.

FIG. 11 is the view of FIG. 10 shortly after the results described therefore, showing further detachment of the slurry body from deformed second level support walls of midline cavities deformed upward, resulting in automatic, stress-induced release of relatively rigid cement-containing slurry body occurs as a substantially single, unbroken body along path 39. Individually, mass 22a is urged outward on path 22b, mass 16a is urged outward on path 16b, and mass 21a is urged outward on path 21b, the three masses substantially rigidly connected, albeit for a very short time, by masses 15a and 15b.

In a specific embodiment, a vertical length of pan 10 is from 55 to 65 inches and a lateral width is from 50 to 60 inches and container 16, defining the second midline mass cavity is from 16 to 24 inches in vertical length, more preferably 18 to 22 inches in vertical length. A preferred depth of pan 10 from plate 12 to a bottom of the second level support floors is from 8 to 15 inches, more preferably from 10 to 12 inches.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

What is claimed is:

1. A method for separating a thixotropic, cement-containing, settled slurry body from a washout pan of less than 300 but more than 100 gallons capacity, the method comprising:
   providing the washout pan comprising
   a generally rectangular box shape, rotomolded of polymer to form an open top box with peripheral walls of from 9 to 15 inches high as measured from a top reinforcing rim plate to a bottom most surface, the washout pan having an overall wall thickness of from 0.15 to 0.75 inches;
   the peripheral walls comprising a lifting section opposed to a bottom section and a right section opposed to a left section, where the lifting section comprises lifting flanges arranged symmetrically about a midline between the lifting section and the bottom section;
   a first level support floor intersecting the peripheral walls at a substantial elevation from a set of second level support floors so that the settled slurry body covers both the first level support floor and the set of second level support floors, where nine openings are defined in the first level support floor, four corner openings being defined adjacent to corners of the peripheral walls, right and left openings defined respectively adjacent to the right and left sections, a first mass cavity opening being defined adjacent to the lifting section, a second mass cavity opening being defined in a center of the first level support floor, and a third mass cavity opening being defined adjacent to the bottom section, where the first, second and third mass cavity openings are symmetrically arranged about the midline and all the openings are spaced substantially away from each other so that the settled slurry body comprises a structurally connected mass during its separation from the washout pan; and
   second level support walls extending down from all the openings to be sealed at second level support floors equidistant and parallel to the first level support floor;
   setting the washout pan horizontally to be filled with the slurry body; and
   lifting the washout pan to a vertical position by way of the lifting flanges, resulting in deformation of highest elevation second level support walls of containers formed about the first, second and third mass cavity openings and detachment of the slurry body from the washout pan.

2. The method of claim 1 wherein a length of the first mass cavity opening has a first length adjacent to the lifting section and has a width normal to that lifting section about one fourth to two thirds of the length of the first mass cavity.

3. The method of claim 2 wherein edges of the second mass cavity opening are parallel to the peripheral walls and have a length about equal to and aligned with that of the first mass cavity opening and with a midline width of the second mass cavity opening equal to its length or a width within ten percent more or less of the length of the first mass cavity.

4. The method of claim 3 wherein the third mass cavity opening is defined adjacent to the bottom section and comprises a generally rectangular shape with a length about equal to that of the first mass cavity opening and has a width normal to the bottom section that is the same width as that of the first mass cavity.

5. The method of claim 4 wherein a separation of opposing edges of the third and second mass cavity openings is equal to a width of the first mass cavity.

6. The method of claim 1 wherein the washout pan contains a slurry body of 4,000 pounds and is adapted to be transported by forks of a forklift horizontally inserted under the washout pan without spilling the slurry body.

7. The method of claim 1 wherein the washout pan contains a slurry body of 8,000 pounds and is adapted to be transported by forks of a forklift horizontally inserted under the washout pan without spilling the slurry body.

8. The method of claim 1 wherein the washout pan contains a slurry body of 4,000 pounds and is adapted to be transported by forks of a forklift horizontally inserted under the washout pan without spilling the slurry body and the washout pan weighs from 40 to 70 pounds.

9. The method of claim 1 wherein the washout box pan contains a slurry body of 4,000 pounds and is adapted to be transported by forks of a forklift horizontally inserted under the washout pan without spilling the slurry body and the washout pan weighs from 50 to 65 pounds.

10. The method of claim 1 wherein a vertical length of the washout pan is from 55 to 65 inches and a lateral width is from 50 to 60 inches.

11. The method of claim 10 wherein a horizontal width of the washout pan is from 50 to 60 inches.

* * * * *